J. H. GACHES.
Combined Putty-Knives and Sprig-Boxes.
No. 136,499.  Patented March 4, 1873.
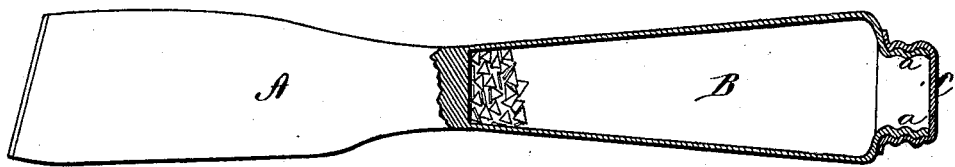

UNITED STATES PATENT OFFICE.

JOHN H. GACHES, OF ATLANTA, GEORGIA.

IMPROVEMENT IN COMBINED PUTTY-KNIVES AND SPRIG-BOXES.

Specification forming part of Letters Patent No. 136,499, dated March 4, 1873.

*To all whom it may concern:*

Be it known that I, JOHN H. GACHES, of Atlanta, in the county of Fulton and in the State of Georgia, have invented certain new and useful Improvements in Combined Putty-Knife and Sprig-Box; and do hereby declare that the following is a full, clear, and exact description thereof, reference being had to the accompanying drawing and to the letters of reference marked thereon making a part of this specification.

The nature of my invention consists in a putty-knife with a hollow handle, provided with a suitable lid to form a sprig-box, as will be hereinafter more fully set forth.

In order to enable others skilled in the art to which my invention appertains to make and use the same, I will now proceed to describe its construction and operation, referring to the annexed drawing, which is a side view of my putty-knife, the handle being in longitudinal section.

A represents an ordinary putty-knife, and B is the handle thereof. This handle is made hollow, and provided on its outer end with an annular flange, a, having exterior screw-threads, and upon which is screwed a cap, C, to close the end of the handle. Any other suitable cover or lid may be used for the same purpose. The hollow handle B thus forms a convenient box, in which the sprigs used by glaziers may be carried.

Having thus fully described my invention, what I claim as new, and desire to secure by Letters Patent, is—

A putty-knife, provided with a hollow handle with a suitable cover or lid to form a sprig-box, substantially as herein set forth.

In testimony that I claim the foregoing I have hereunto set my hand and seal this 2d day of December, 1872.

JOHN H. GACHES. [L. S.]

Witnesses:
S. E. CLARKE,
V. C. NORCROSS.